United States Patent
Yang

(10) Patent No.: US 12,519,125 B2
(45) Date of Patent: *Jan. 6, 2026

(54) METHOD FOR SUPPRESSING THERMAL RUNAWAY OF LITHIUM BATTERIES

(71) Applicants: PROLOGIUM TECHNOLOGY CO., LTD., Taoyuan (TW); Prologium Holding Inc., Grand Cayman (KY)

(72) Inventor: Szu-Nan Yang, Taoyuan (TW)

(73) Assignees: PROLOGIUM TECHNOLOGY CO., LTD., Taoyuan (TW); PROLOGIUM HOLDING INC., Grand Cayman (KY)

( * ) Notice: Subject to any disclaimer, the term of this patent is extended or adjusted under 35 U.S.C. 154(b) by 15 days.

This patent is subject to a terminal disclaimer.

(21) Appl. No.: 18/625,777

(22) Filed: Apr. 3, 2024

(65) Prior Publication Data

US 2024/0250285 A1    Jul. 25, 2024

Related U.S. Application Data

(63) Continuation of application No. 17/372,012, filed on Jul. 9, 2021, now Pat. No. 12,002,920.

(Continued)

(51) Int. Cl.
*H01M 10/052* (2010.01)
*H01M 10/0525* (2010.01)
(Continued)

(52) U.S. Cl.
CPC ..... *H01M 10/052* (2013.01); *H01M 10/0525* (2013.01); *H01M 10/0567* (2013.01);
(Continued)

(58) Field of Classification Search
None
See application file for complete search history.

(56) References Cited

U.S. PATENT DOCUMENTS 5,750,282 A    5/1998  Chi et al.
9,711,774 B2   7/2017  Liu et al.
(Continued)

FOREIGN PATENT DOCUMENTS

CN    1731601 A    2/2006
CN  101145623 A    3/2008
(Continued)

OTHER PUBLICATIONS

Extended European Search Report issued Jan. 4, 2022 in Application No. 21188016.6.

(Continued)

*Primary Examiner* — Jose I Hernandez-Kenney
(74) *Attorney, Agent, or Firm* — RABIN & BERDO, P.C.

(57) ABSTRACT

The invention provides a method for suppressing thermal runaway of lithium batteries, which is included a step of providing a lithium battery capable of performing charging and discharging, which includes an electrochemical reaction system. When the temperature of the lithium battery reaches to a predetermined temperature, a metal ion (A) and an amphoteric metal ion (B) are applied to the positive active material layer and the negative active material layer of the lithium battery to passivate the positive active material layer and the negative active material layer. The metal ion (A) is selected from a non-lithium alkali metal ion, an alkaline earth metal ion or a combination thereof to prevent the thermal runaway from occurring.

17 Claims, 14 Drawing Sheets

Related U.S. Application Data

(60) Provisional application No. 63/087,563, filed on Oct. 5, 2020, provisional application No. 63/058,205, filed on Jul. 29, 2020.

(51) Int. Cl.
  *H01M 10/0567* (2010.01)
  *H01M 10/058* (2010.01)
  *H01M 10/42* (2006.01)

(52) U.S. Cl.
  CPC ..... *H01M 10/058* (2013.01); *H01M 10/4235* (2013.01); *Y02E 60/10* (2013.01); *Y02P 70/50* (2015.11)

(56) References Cited

U.S. PATENT DOCUMENTS

| | | | |
|---|---|---|---|
| 12,243,978 B2 * | 3/2025 | Wujcik | H01M 10/0525 |
| 2005/0130043 A1 | 6/2005 | Gao et al. | |
| 2008/0026283 A1 | 1/2008 | Park et al. | |
| 2008/0241655 A1 | 10/2008 | Ogawa et al. | |
| 2009/0246613 A1 | 10/2009 | Park et al. | |
| 2010/0021801 A1 * | 1/2010 | Park | H01M 50/171 |
| | | | 429/246 |
| 2010/0279173 A1 | 11/2010 | Hying et al. | |
| 2013/0171484 A1 | 7/2013 | Baginska et al. | |
| 2014/0147746 A1 | 5/2014 | Tanaka | |
| 2014/0154533 A1 | 6/2014 | Schaefer et al. | |
| 2015/0111086 A1 * | 4/2015 | Arnold | H01M 50/489 |
| | | | 29/623.5 |
| 2016/0141720 A1 | 5/2016 | Onozaki et al. | |
| 2016/0233474 A1 | 8/2016 | Kagami et al. | |
| 2017/0146191 A1 | 5/2017 | Gehlhausen et al. | |
| 2017/0338513 A1 | 11/2017 | Chiang et al. | |
| 2018/0019476 A1 * | 1/2018 | Qiao | H01M 50/581 |
| 2018/0190967 A1 | 7/2018 | Suanamaki et al. | |
| 2019/0097265 A1 * | 3/2019 | Takshi | H01M 10/654 |
| 2020/0168877 A1 | 5/2020 | Lee et al. | |
| 2020/0373584 A1 | 11/2020 | Morin et al. | |

FOREIGN PATENT DOCUMENTS

| | | | | |
|---|---|---|---|---|
| CN | 104218193 | A | 12/2014 | |
| CN | 103500806 | B | 5/2016 | |
| CN | 106469794 | A | 3/2017 | |
| CN | 109063410 | A | 12/2018 | |
| CN | 208336379 | U | 1/2019 | |
| EP | 3591737 | A1 | 1/2020 | |
| JP | H10270084 | A | 10/1998 | |
| JP | H10340739 | A | 12/1998 | |
| JP | 2010507898 | A | 3/2010 | |
| JP | 2010287492 | A | 12/2010 | |
| JP | 2011124074 | A | 6/2011 | |
| JP | 2016062872 | A | 4/2016 | |
| JP | 2017142892 | A | 8/2017 | |
| KR | 20080036462 | A * | 4/2008 | H01M 50/545 |
| KR | 1020080036462 | A | 4/2008 | |
| RU | 2156523 | C2 | 9/2000 | |
| RU | 2354012 | C2 | 4/2009 | |
| RU | 2009136983 | C2 | 4/2011 | |
| RU | 2014106998 | A | 9/2015 | |
| TW | 201940492 | A | 10/2019 | |
| WO | WO-2018140304 | A1 * | 8/2018 | B01J 13/043 |
| WO | 2020086310 | A1 | 4/2020 | |

OTHER PUBLICATIONS

Extended European Search Report issued Jan. 7, 2020 in Application No. 21188019.0.

Extended European Search Report issued Jan. 7, 2022 in Application No. 21188020.8.

* cited by examiner providing a lithium battery including an electrochemical reaction system, and a plurality of through holes are formed on the current collecting layer of the lithium battery and an ion supplier, providing the metal ion (A) and the amphoteric metal ion (B) and is located at the through holes ~S12 applying an metal ion (A) and an amphoteric metal ion (B) to the electrochemical system via the through holes, when a temperature of the lithium battery reaches to a predetermined temperature ~S22

FIG. 2 providing a lithium battery including an electrochemical reaction system, and an ion supplier, providing the metal ion (A) and the amphoteric metal ion (B) and including a protection mechanism, located inside the lithium battery ~ S14 applying an metal ion (A) and an amphoteric metal ion (B) to the electrochemical system via the through holes, when a temperature of the lithium battery reaches to a predetermined temperature and the protection mechanism is failed ~ S24

FIG. 5

METHOD FOR SUPPRESSING THERMAL RUNAWAY OF LITHIUM BATTERIES

CROSS REFERENCES TO RELATED APPLICATIONS

This application is a continuation of U.S. application Ser. No. 17/372,012, filed on Jul. 9, 2021, which claims benefit under 35 U.S.C. § 119(a) of U.S. Provisional Patent Application No. 63/058,205, filed on Jul. 29, 2020 and U.S. Provisional Patent Application No. 63/087,563, filed on Oct. 5, 2020, and the entire contents of which are hereby incorporated by reference for all purposes.

BACKGROUND OF THE INVENTION

Field of Invention

The present invention relates to a method for improving safety of the lithium batteries, in particular to a method for suppressing thermal runaway of the lithium batteries by passivating the positive active material layer and the negative active material layer.

Related Art

Because lithium-ion batteries are widely used in various products, such as vehicles, wearable products for consumers and industrial applications, portable devices and energy storage devices and so on, they are almost applied in all areas of human daily life. However, the event of accidents for the lithium-ion batteries are heard from time to time, such as the fire or explosion of mobile phone batteries and electric vehicles. These are all because the lithium batteries still lack comprehensive and effective solutions for safety issues.

The main cause of unsafe event for fire or explosion in the lithium batteries is the thermal runaway. And the main cause of the thermal runaway of the lithium batteries is heat, which is the exothermic reactions result from the thermal cracking, induced by the elevated temperature, of the SEI (solid electrolyte interface) film, the electrolyte, the binder, and the positive and negative active materials in the battery. The current methods for suppression thermal runaway can be classified into two types: outside the battery cell and inside the battery cell, depending on the arranged location. For the type of outside the battery cell, a monitoring system is utilized, which uses digital arithmetic simulation. For the type of inside the battery cell, it can be further divided into physical or chemical methods. In the digital monitoring system outside the battery cell, the dedicated protection circuit and the dedicated management system on the outside of the battery cell are utilized to enhance the safety monitoring of the battery during the usage process. For the physical type of inside the battery cell, such as thermal shutdown separator, at elevated temperature for the battery cell, the holes of the separator are closed to block the passage of the ions.

For the chemical type of inside the battery cell, it can be defined as a scale controlled type or an electrochemical reaction type. In the scale controlled type, the flame retardant is added into the electrolyte to control the scale of the thermal runaway. The examples of the electrochemical reaction types are as follows:

a. The monomer or oligomer is added into the electrolyte. The polymerization will be occurred when the temperature rises to reduce the rate of the ion migration. Therefore, the ionic conductivity decreases as the temperature rises, and the electrochemical reaction rate in the cell slows down;

b. A positive temperature coefficient (PTC) resistance material is sandwiched between the positive electrode layer or the negative electrode layer and the adjacent current collecting layer. When the temperature of the battery cell is elevated, the electrical insulation ability is enhanced. The electric power transmission efficiency between the positive electrode layer or the negative electrode layer between the adjacent current collecting layer is reduced and the electrochemical reaction rate is also decreased; and c. A modified layer is formed on the surface of the positive active material. When the temperature of the battery cell is elevated, the modified layer is transformed into a dense film, which increases the resistance of the charge transfer to reduce the electrochemical reaction rate.

However, the above methods are aimed only for passive blocking the ion/electron migration pathway to reduce the heat generation, not for the main source to generate the maximum energy to cause the thermal runaway and the main reaction body of the entire electrochemical reaction, i.e. the active materials. Therefore, this invention provides a method for suppressing thermal runaway of the lithium batteries by decreasing the thermal energy leading to thermal runaway of the active materials to mitigate or obviate the aforementioned problems.

SUMMARY OF THE INVENTION

It is an objective of this invention to provide a brand new method for suppressing thermal runaway of the lithium batteries, which is capable of passivating the positive and the negative active materials to block the electrochemical reaction pathway to effectively avoid the thermal runaway of the battery.

In order to implement the abovementioned, this invention discloses a method for suppressing thermal runaway of the lithium batteries, which includes the steps of: step a): providing a lithium battery capable of performing charging and discharging, which includes an electrochemical reaction system; and step (b): applying a metal ion (A) and an amphoteric metal ion (B) to a positive active material layer and a negative active material layer of the lithium battery, when a temperature of the lithium battery reaches to a predetermined temperature, to passivate the positive active material layer and the negative active material layer to block the electrochemical reaction pathway to effectively avoid the thermal runaway of the battery. The metal ion (A) is selected from a non-lithium alkali metal ion, an alkaline earth metal ion or a combination thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 2 is a flowchart illustrating another example of steps for the method for suppressing thermal runaway of the lithium batteries in accordance with the present invention.

FIG. 5 is a flowchart illustrating another example of steps for the method for suppressing thermal runaway of the lithium batteries in accordance with the present invention.

DETAILED DESCRIPTION OF THE INVENTION

Figure 1:
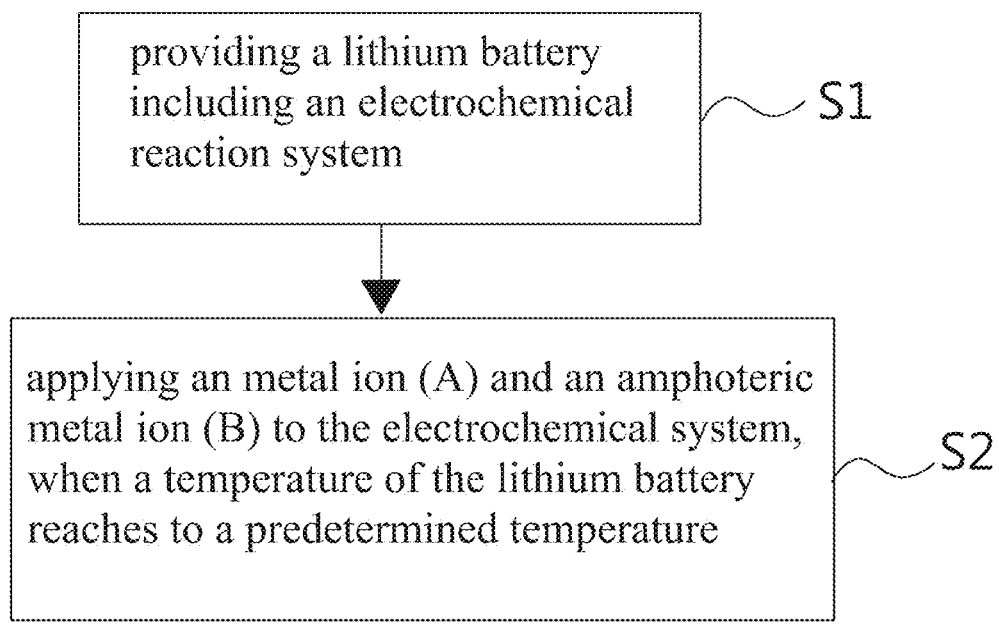
FIG. 1 is a flowchart illustrating an example of steps for the method for suppressing thermal runaway of the lithium batteries in accordance with the present invention.

The present invention will be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes.

The terminology used herein is for the purpose of describing particular embodiments only and is not intended to be limiting of the general inventive concept. As used herein, the singular forms "a", "an", and "the" are intended to include the plural forms as well, unless the context clearly indicates otherwise. Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may Furthermore, the particular features, structures or characteristics may be combined in any suitable manner, as would be apparent to one of ordinary skill in the art from this disclosure, in one or more embodiments.

First, please refer to FIG. 1, which is a flowchart illustrating an example of steps for the method for suppressing thermal runaway of the lithium batteries in accordance with the present invention. As shown in the figure, the first step S1 is "providing a lithium battery including an electrochemical reaction system". The lithium battery is capable of performing charging and discharging. It means that the lithium battery can have a positive active material with lithium-ion extraction and a negative active material with lithium-ion insertion. Then the step S2 is "applying an additional metal ion (A) and an additional amphoteric metal ion (B) to the lithium battery, when a temperature of the lithium battery reaches to a predetermined temperature". The metal ion (A) and the amphoteric metal ion (B) will perform chemical reactions with the positive active material with lithium-ion extraction and the negative active material with lithium-ion insertion to make the positive active material and the negative active material of the electrochemical reaction system be a passivation state with lower energy comparing to the original states. Therefore, the electrochemical reaction pathway is blocked to effectively avoid the thermal runaway of the battery. The metal ion (A) is selected from a non-lithium alkali metal ion, an alkaline earth metal ion or a combination thereof. The predetermined temperature is 70-130° C. Moreover, the above-mentioned "additional" means that the lithium battery already has the necessary materials for performing charging and discharging and the metal ion (A) and the amphoteric metal ion (B) are additionally added in the lithium battery/these materials.

When the metal ion (A) is selected from the non-lithium alkali metal ion, which is preferably selected from a sodium ion, a potassium ion or a combination thereof. When the metal ion (A) is selected from the alkali earth metal ion, which is preferably selected from a beryllium ion, a magnesium ion or a calcium ion. The amphoteric metal ion (B)

is an aluminum ion or a zinc ion. The above-mentioned electrochemical reaction system includes a positive active material layer, a negative active material layer, a separator sandwiched between the positive active material layer and the negative active material layer, and an electrolyte system filled in the electrochemical reaction system. The electrolyte system may be liquid, solid or the combinations thereof.

After the metal ion (A) and the amphoteric metal ion (B) are introduced the electrochemical reaction system of the lithium battery, for the positive active material, the metal ion (A) will obtain electrons from the positive active material and deposit on the surface of the positive active material and then further migrate to occupy the positive of the lithium-ion extraction. The positive active material with lithium-ion extraction is transferred from an original state with higher electric potential and higher energy to a passivation state with lower electric potential and lower energy. Moreover, it is unstable in structure and easy to release oxygen substance ($O_2$, $O_2^-$, $O^-$) due to the loss of lithium atoms in the original state of the positive active material. The metal atoms formed by the metal ion (A) with electrons, such as the sodium will be driven by thermal energy to fill the positive of the lithium-ion extraction, i.e. the intercalation, and relocate the lattice to form a new stable state, and at the same time, thermal energy is consumed. Further, when the metal atoms formed by the metal ion (A), such as the sodium, are filled into the positive of the lithium-ion extraction, this new stable state structure will represent some of the characteristics of the sodium, due to contain the sodium, such as increased adsorption of moisture. That will increase the insulating properties of the electrodes and result in a decrease in performance. Similarly, for the negative active material, the metal ion (A) and the amphoteric metal ion (B) will react with the negative active materials with lithium-ion insertion. The negative active material with lithium-ion insertion is transferred from an original state with lower electric potential and higher energy to a passivation state with higher electric potential and lower energy. Therefore, this invention can achieve to passivate the positive and the negative active materials, by applying the additional metal ion (A) and the additional amphoteric metal ion (B), to block the electrochemical reaction pathway to effectively avoid the thermal runaway of the battery.

Regarding the step S2 of applying an additional metal ion (A) and an additional amphoteric metal ion (B) to the lithium battery, it includes the following types: 1) the metal ion (A) and the amphoteric metal ion (B) are provided from the outside of the lithium battery to the electrochemical reaction system; and 2) the metal ion (A) and the amphoteric metal ion (B) are provided from the inside of the lithium battery to the electrochemical reaction system.

Regarding the above-mentioned method of providing the metal ion (A) and the amphoteric metal ion (B) from the outside of the lithium battery into the electrochemical reaction system, the following paths can be utilized, such as a pressure release member formed on the lithium battery casing, the holes caused by the swelling of the lithium battery, or the breaches caused by the puncture. Moreover, the path may be formed in purposes for providing the metal ion (A) and the amphoteric metal ion (B) from the outside of the lithium battery into the electrochemical reaction system. The following description is illustrated for the example of the forming in purposes.

Figure 3A:
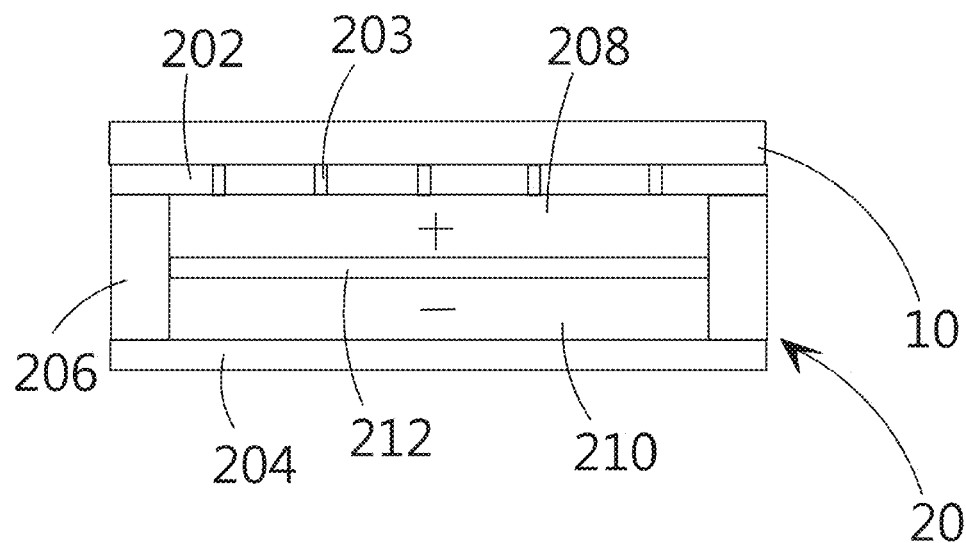
FIGS. 3A and 3B are schematic diagrams of the battery cells according to FIG. 2.

Please refer to FIG. 2 and FIG. 3A, the step S12 is "providing a lithium battery 20 including an electrochemical reaction system, and a plurality of through holes 203 are formed on the current collecting layer 202 of the lithium battery 20 and an ion supplier 10, providing the metal ion (A) and the amphoteric metal ion (B) and is located at the through holes 203". The lithium battery 20 has a plurality of through holes 203 formed on the current collecting layer 202. One ends of the through holes 203 are exposed to the outside of the lithium battery 20, and the other ends are connected to the electrochemical reaction system, i.e. the active material layers 208, 210 and the separator 212. The ion supplier 10 is disposed on the outer surface of the lithium battery 20 and covers the through holes 203. Under such structure, due to the ion supplier 10 is disposed outside the lithium battery 20, it will not affect the efficiency or composition of the electrochemical reaction system of the lithium battery 20. The diameter of the through hole is 5-250 micrometers. Then when the temperature of the lithium battery 20 reaches to the predetermined temperature, the ion supplier 10 will apply the metal ion (A) and the amphoteric metal ion (B) to the electrochemical reaction system via the through holes 203 (step S22).

Furthermore, for above-defined where the positive active material is transferred from the state with higher electric potential and higher energy to the state with lower electric potential and lower energy, the detailed description is provided below. The positive active material is in the state with lithium-ion extraction and the electric potential is higher. Also, because of the unstable crystal lattice, the crystal lattice is easy to collapse and has a higher ability to release oxygen, and to release thermal energy violently. Therefore, in the above-mentioned, it is defined that the positive active material is in the state with higher electric potential and higher energy that can cause thermal runaway. When the metal ion (A) fills the positions where lithium-ion is extracted or the intercalations, the electric potential of the positive active material is reduced, and the crystal lattice of the positive active material is relatively stable. Also, the stability of the crystal lattice of the positive active material is higher, and the ability of the oxygen-releasing is reduced, and the ability to release thermal energy violently is lowered. Therefore, in the above-mentioned, it is defined that the positive active material is in the passivation state after reacting with the metal ion (A) is defined as the crystalline state with lower electric potential and lower energy.

For above-defined where the negative active material is transferred from the state with lower electric potential and higher energy that can cause thermal runaway to the state with higher electric potential and lower energy, the detailed description is provided below. The negative active material is in the state with lithium-ion insertion and the electric potential is lower. In addition, because the negative active material receives the oxygen released from the positive active material, the negative active material is prone to violently combust and release thermal energy. Therefore, the negative active material is unstable and has a higher ability to release thermal energy. Therefore, in the above-mentioned, it is defined that the negative active material is in the state with lower electric potential and higher energy. When the metal ion (A) and the amphoteric metal ion (B) act with the negative active material with lithium-ion insertion, the lithium-ion is extracted and form the polymer compound with the base material of the negative active material, such as silicon-carbon. As well as the reduction of the ability to release oxygen of the positive active material, the ability of the negative active material to release thermal energy violently is lowered. Therefore, in the above-mentioned, it is defined that the negative active material is in the passivation state after reacting with the metal ion (A) and the amphoteric metal ion (B) is defined as the polymer compound state with higher electric potential and lower energy.

The ion supplier 10 includes a compound capable of providing the metal ion (A) and a compound capable of providing the amphoteric metal ion (B). For example, the compound capable of providing the metal ion (A) may be NaOH, KOH, NaCl, NaNO$_3$, KNO$_3$, or the like. The compound capable of providing the amphoteric metal ion (B) may be AlCl$_3$, AlBr$_3$, AlI$_3$, Al(NO$_3$)$_3$, AlClO$_4$, AlF$_3$, AlH$_3$, Zn(OH)$_2$, or the like. Also, the ion supplier 10 may be a compound capable of providing the metal ion (A) and the amphoteric metal ion (B), such as NaAl(OH)$_4$ or the like.

The lithium battery 20 of this embodiment includes a first current collecting layer 202, a second current collecting layer 204, a glue frame 206, an electrochemical reaction system, a separator 212 and an electrolyte system. The glue frame 206 is sandwiched between the first current collecting layer 202 and the second current collecting layer 204. One end of the glue frame 206 is adhered to the first current collecting layer 202 and the other end of the glue frame 206 is adhered to the second current collecting layer 204. The first current collecting layer 202, the second current collecting layer 204, and the glue frame 206 form an enclosed space (the through holes 203 are not considered here). The electrochemical reaction system arranged in the enclosed space, which includes a first active material layer 208 adjacent to the first current collecting layer 202 and a second active material layer 210 adjacent to the second current collecting layer 204. The first active material layer 208 and the second active material layer 210 are positive and negative active materials, respectively. The separator 212 is located between the first active material layer 208 and the second active material layer 210 and has ion conduction characteristics and electrical insulation properties. The electrolyte system is located in the enclosed space and impregnated or mixed in the first active material layer 208 and the second active material layer 210 for use in ion transfer. Moreover, the first active material layer 208 and second active material layer 210 may further include the electrically conductive materials and the adhesive materials. Since these parts are not technical features of this invention, the detailed description is omitted herein.

In addition, the material of the separator 212 can be selected from various types in the battery industry. For example, the separator 212 is composed of a solid electrolyte, or an electrical insulation layer with holes formed of a polymer material with coating on its surface by the ceramic powders. Also, the separator 212 may also be formed by stacking only ceramic powders by using an adhesive. The ceramic powders may not have ion conductivity, or may also have ion conductivity. The through hole 203 penetrates the first current collecting layer 202 to connect with the upper and lower surfaces thereof. Therefore, one end of the through hole 203 is exposed to the external environment of the lithium battery 20, and the other end is connected to the electrochemical reaction system of the lithium battery 20. The first collector layer 202 may be the positive current collecting layer or the negative current collecting layer. The polarity of the first current collecting layer 202 is different from the polarity of the second current collecting layer 204. For example, when the first current collecting layer 202 is the positive current collecting layer, the second current collecting layer 204 is the negative current collecting layer. The first current collecting layer 202, second current collecting layer 204, and the glue frame 206 are used as packaging component of the battery. In other words, when the through holes 203 are not considered, the electrochemical reaction system of the lithium battery 20 is protected from the external environment by this packaging component.

The glue frame 206 is made of a polymer material without particular requirements. As long as it can be adhered to the surfaces of the first and second current collecting layers 202, 204 and is durable to the electrolyte system. However, the thermosetting resin is preferable, for example, silicone. The negative active material may be a carbon material, a silicon-based material, or a mixture thereof. Examples of carbon materials include graphitized carbon materials and amorphous carbon materials, such as natural graphite, modified graphite, graphitized mesophase carbon particles, soft carbons, such as cokes, and some hard carbons. Silicon-based materials include silicon, silicon oxides, silicon-carbon composite materials, and silicon alloys.

Figure 3B:
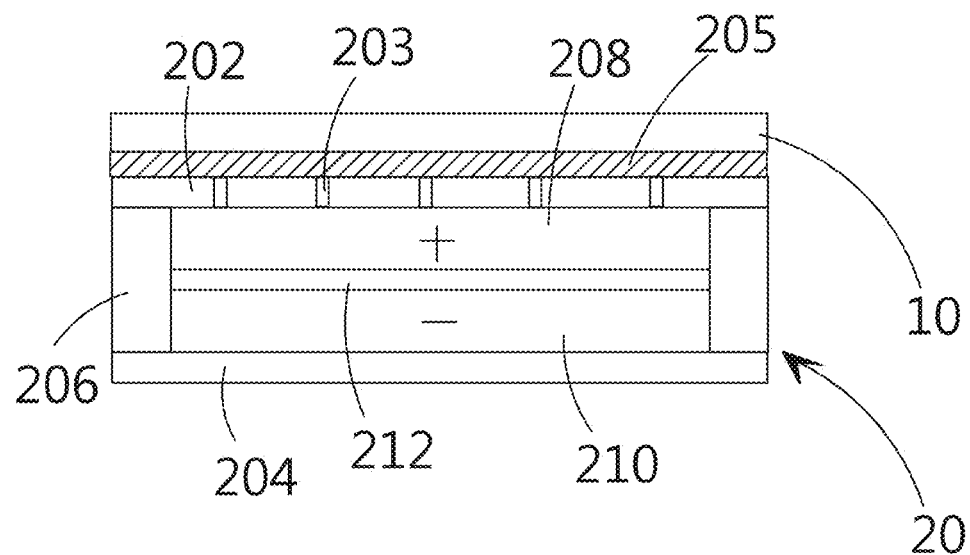

The method of forming the through holes 203 in the current collecting layer 202 may be directly punching and preforming in the current collecting layer 202. Furthermore, in order to prevent the ion supplier 10 of the metal ion (A) and the amphoteric metal ion (B) from interacting with the electrochemical reaction system caused via the pre-formed through holes 203, for example the electrolyte leaks to affect the ion supplier 10 or the ion supplier 10 is infiltrated to affect the electrochemical reaction system. Therefore, a removable gate layer 205 is disposed on the openings of the through holes 203 to temporarily close the opening, as shown in FIG. 3B. The gate layer 205 is destroyed to expose the openings of the through holes 203. For example, the gate layer 205 is made of materials that can be destroyed by etching, and the materials for etching the gate layer 205 can be provided from the ion supplier 10 of the metal ion (A) and the amphoteric metal ion (B) or additional applying. The gate layer 205 may also be made of a heat-sensitive material, which can be melting by heating as the destructing mechanism, or the gate layer 205 can be made of a depolymerizable material, and the material to induce the depolymerization may be provided from the ion supplier 10 of the metal ion (A) and the amphoteric metal ion (B) or additional applying.

Figure 4:
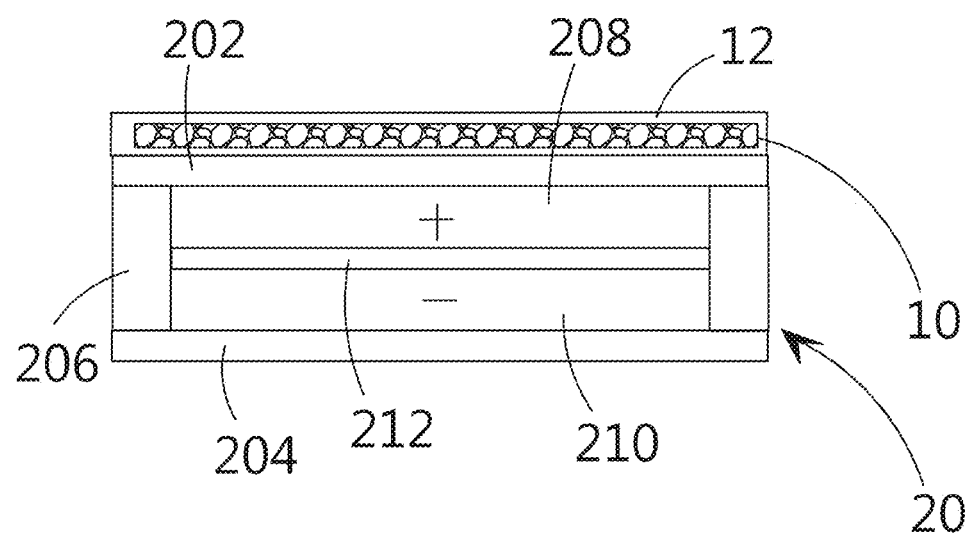
FIG. 4 is a schematic diagram of another embodiment of the battery cells according to FIG. 2.

Another method to form the through holes 203 in the current collecting layer 202 is by etching, for example, the ion supplier 10 of the metal ion (A) and the amphoteric metal ion (B) may have etching capability, and the etching capability will be triggered by temperature. For example, the outer surface of the ion supplier 10 is covered with a protecting layer 12 composed of a thermosensitive decomposition material. As shown in FIG. 4, when the temperature is near to the predetermined temperature, the protecting layer 12 would decompose to expose/release the ion supplier 10 and cause the ion supplier 10 to exhibit the etching attack capability to the external component (the current collecting layer 202). On the other hand, the ion supplier 10 may have a decomposable composition triggered by temperature, such as water-releasing materials. At high temperatures, the water-releasing materials decomposed endothermically to release water to adjust the concentration or ion characteristics of the ion supplier 10 to exhibit the etching attack capability.

Figure 6:
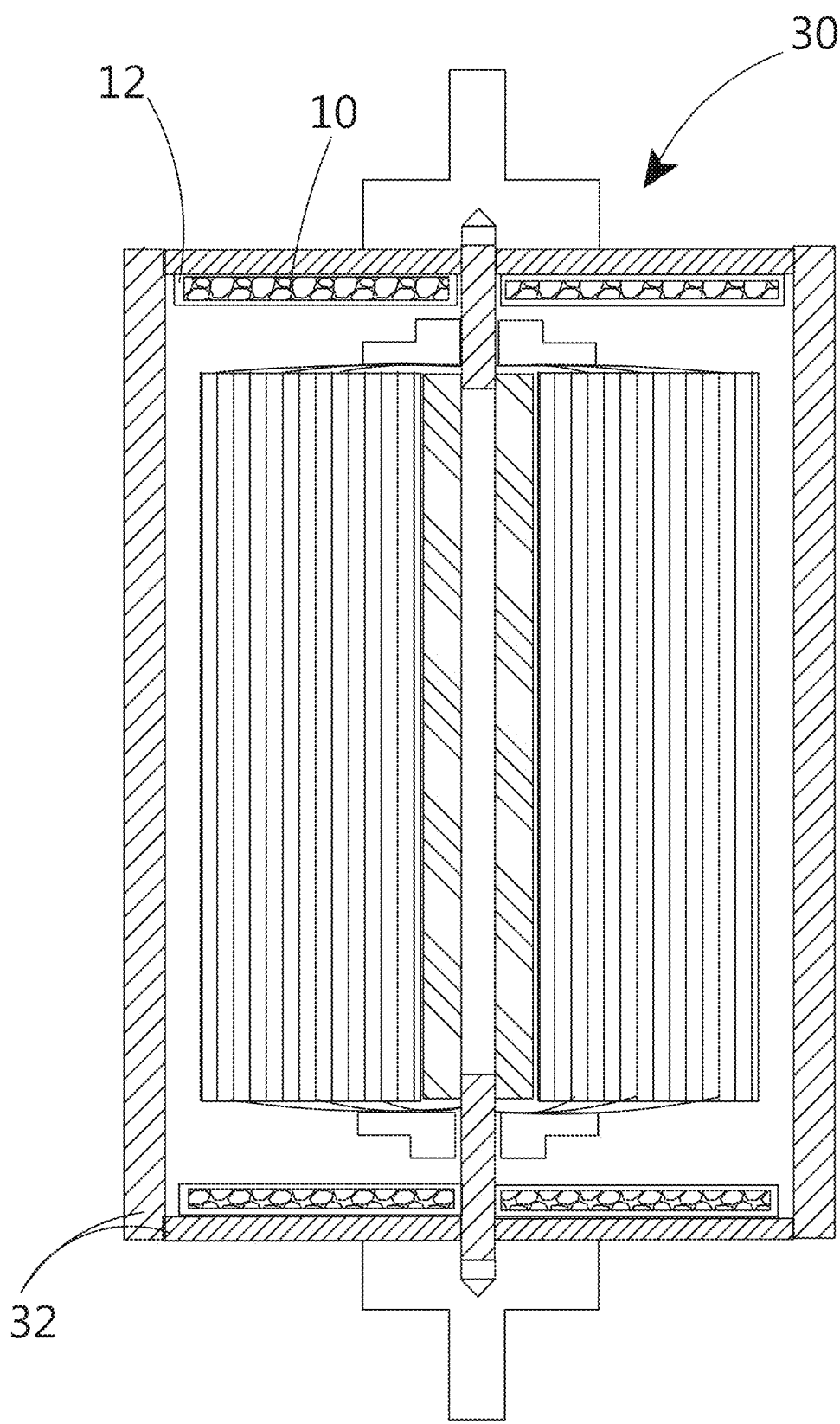
FIG. 6 is a schematic diagram of an embodiments of the lithium battery with suppressing thermal runaway of this invention.

Please refer to FIG. 5, which is used to illustrate the metal ion (A) and the amphoteric metal ion (B) are provided inside the lithium battery to enter the electrochemical reaction system. As shown in the figure, the lithium battery 20 further includes an ion supplier 10, providing the metal ion (A) and the amphoteric metal ion (B), and located inside the lithium battery 20, wherein a surface of the ion supplier 10 includes a removable protection mechanism (step S14). For example, a protecting layer is coated on the surface of a film-like type of the ion supplier 10, or the ion supplier 10 is divided into portions in capsule to avoid improper interactions between the electrochemical reaction system and the ion supplier 10. Then, in step S24, when the temperature of the lithium battery 20 reaches to the predetermined temperature, the removable protection mechanism is failed and the ion supplier 10 will apply the metal ion (A) and the amphoteric metal ion (B) to the electrochemical reaction system. And the metal ion (A) and the amphoteric metal ion (B) react with the positive and negative active materials for passivation. For the protection mechanism, for example, the ion supplier 10, providing the metal ion (A) and the amphoteric metal ion (B), is coated with the above-mentioned protecting layer 12 and arranged in the packaging casing 32 of the lithium battery 30. The ion supplier 10 does not disposed in the active material layers or the separator of the electrochemical reaction system, as shown in FIG. 6.

Figure 7A:
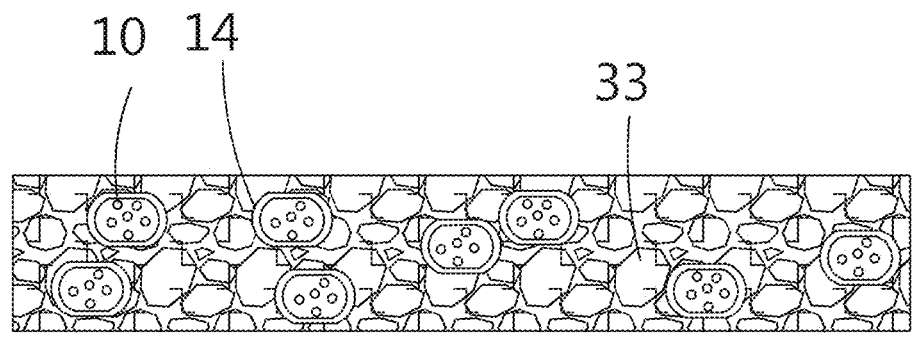
FIG. 7A is a schematic diagram of the active material layer with the ion supplier for applying metal ions (A) and (B) of this invention.
Figure 7B:
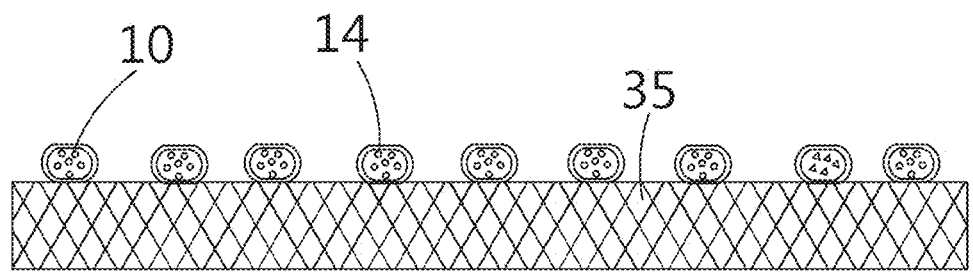
FIG. 7B is a schematic diagram of the separator coated with the ion supplier for applying metal ions (A) and (B) of this invention.
Figure 7C:
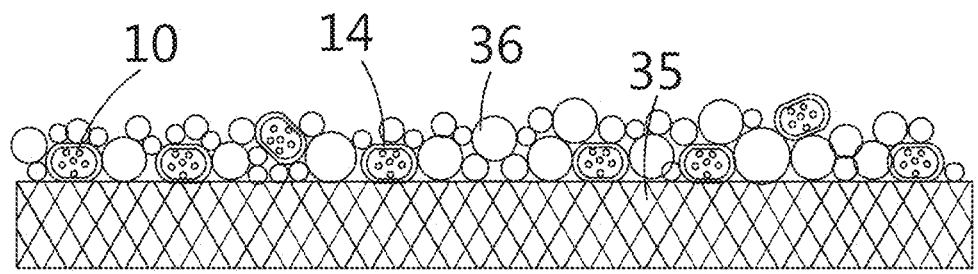
FIG. 7C is a schematic diagram of the separator of this invention, which the surface of the separator includes the ceramic powders and the ion supplier.
Figure 7D:
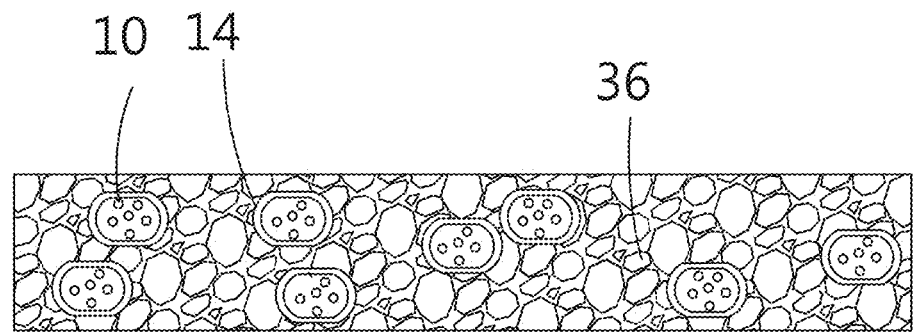
FIG. 7D is a schematic diagram of the ceramic powders mixed with the ion supplier for applying metal ions (A) and (B) of this invention.

The ion supplier 10 is contained in the capsule 14 and mixed in the active material layer 33 of the electrochemical reaction system, as shown in FIG. 7A, or coated on the surface of the separator 35, as shown in FIG. 7B. Also, the surface of the separator 35 can also be coated with a reinforcing material, such as ceramic powders 36, as shown in FIG. 7C, or mixed with the ceramic powder 36 of the separator 35 in case of no substrates presented, as shown in FIG. 7D. These ceramic powders 36 may have ion conductivity or do not have ion conductivity. Moreover, the capsules 14 are mixed in the electrolyte (whether liquid or solid). In this embodiment, the capsule 14 is used as a protection mechanism of the ion supplier 10 to prevent the ion supplier 10 from reacting with the components in the electrochemical reaction system when the predetermined temperature is not reached. This method can be applied to the lithium battery structure with the glue frame and the current collecting layer as the packaging structure, and it can also be applied to the lithium battery that does not use the current collecting layer and the glue frame as the packaging structure, such as the metal casing, as shown in FIG. 6, or the lithium batteries packed by aluminum plastic film.

The thermosensitive decomposition material of the protecting layer 12 is selected from paraffin oil, microcrystalline wax, polyethylene wax, low density PE (polyethylene), poly(trans-1,4-butadiene), poly(tetramethylene oxide), iso-tactic poly(methyl methacrylate), poly(ethylene oxide), poly (ethylene adipate), isotactic poly(1-butene), and poly(ethylene). Also, the thermosensitive decomposition material is mixed with a mineral oil to lower softening points.

The material of the capsule 14 is determined by the compound to be contained. For example, when the decomposable composition triggered by temperature of the ion supplier 10 is selected from the water-releasing materials, the material of the capsule 14 is selected from a material, which is easy to dissolve in polar solutions such as water, such as gelatin, gum arabic, chitosan, sodium caseinate, starch, lactose, maltodextrin, poly-l-lysine/alginate, polyethyleneimine/alginate, calcium alginate, polyvinyl alcohol. When the material of the capsule 14 is the thermosensitive decomposition material, which is selected from ethyl cellulose, polyethylene, polymethacrylate, cellulose nitrate, silicones, paraffin, carnauba wax, stearic acid, fatty alcohols, stearyl alcohol, fatty acids, hydrocarbon resin, monoacyl glycerol, diacyl glycerol, and triacyl glycerol. When the ion supplier 10 is selected form the material that exhibits the etching capability in specific temperature, the material of the capsule 14 is selected from an etchable material. However, these descriptions are just examples. Those who have ordinary skill in this art will understand that changes can be made to the specific embodiments without departing from the spirit and scope of the invention.

Continuing, it is to verify that the method of this invention could act to the positive and negative active materials, and make the structure of the positive and negative active materials change to suppress the thermal runaway. In this experiment, the positive active material is NMC811, and the negative active material is silicon-carbon. The metal ion (A) is sodium or potassium ion, and the amphoteric metal ion (B) is aluminum ion.

Figure 8:
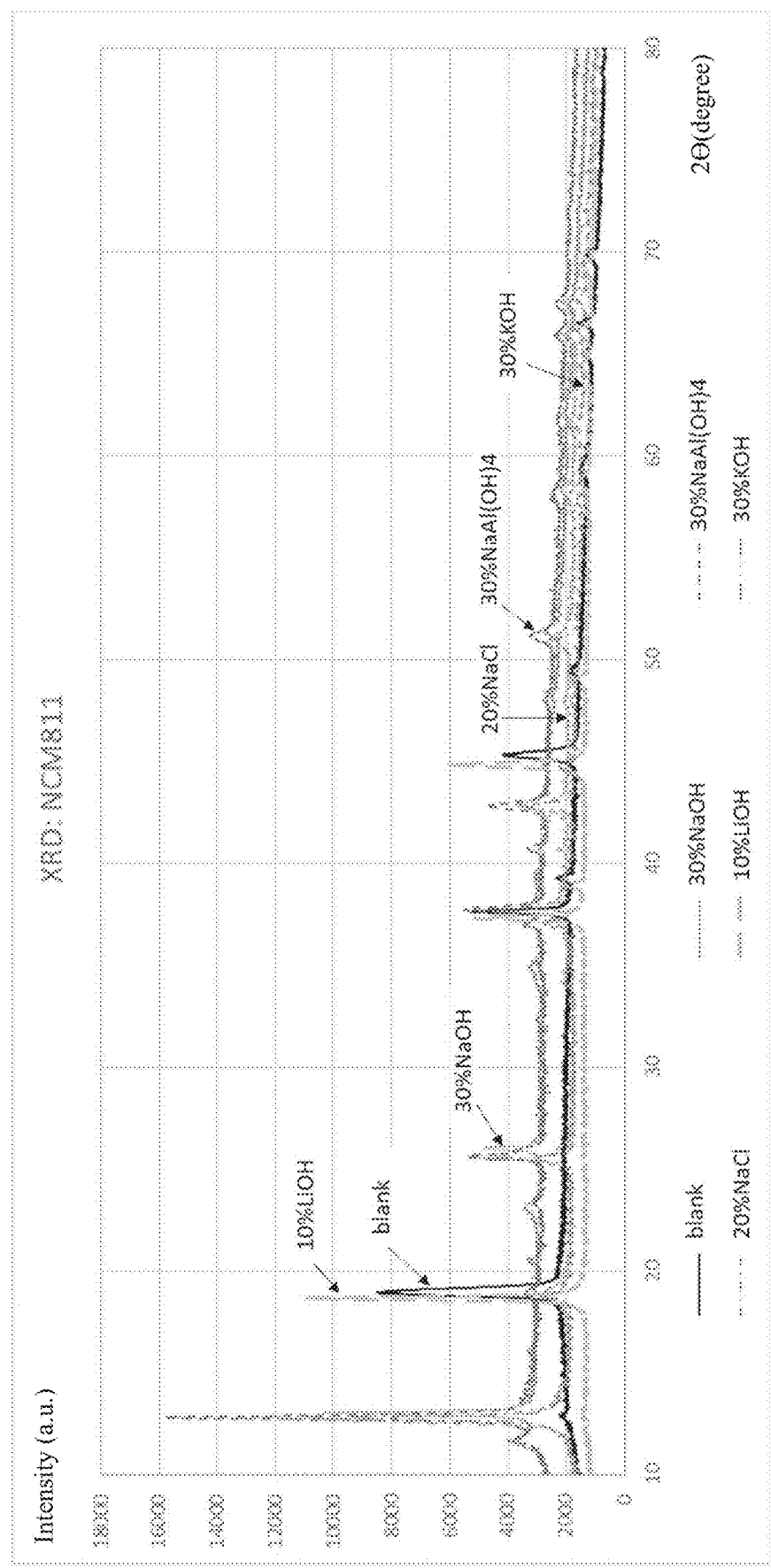
FIG. 8 is an XRD diffraction pattern in which the concentrations of 30% $NaOH_{(aq)}$, 30% $NaAl(OH)_{4(aq)}$, 20% $NaCl_{(aq)}$, 10% $LiOH_{(aq)}$, and 30% $KOH_{(aq)}$ react with the positive active material with lithium-ion extraction.

Please refer to FIG. 8, which is an XRD diffraction pattern in which the concentrations of 30% NaOH, 30% NaAl(OH)$_4$, 20% NaCl, 10% LiOH, and 30% KOH react with the positive active material with lithium-ion extraction. It can be seen from the figure that after the NMC811 with lithium-ion extraction reacts with sodium or potassium ions, the characteristic peak (pointed by the arrows) of NMC811 is no longer existed, and the lattice structure has been changed due to the insertion of sodium or potassium ions. This may be because the sodium/potassium ions with larger sizes, heavier weight, and higher potential energy obtain electrons on the surface of the positive active material to form sodium/potassium atoms. And by the absorption of thermal energy, they will migrate to the position of lithium-ion extraction or intercalations to form a structure with more stable and lower energy.

Figure 9:
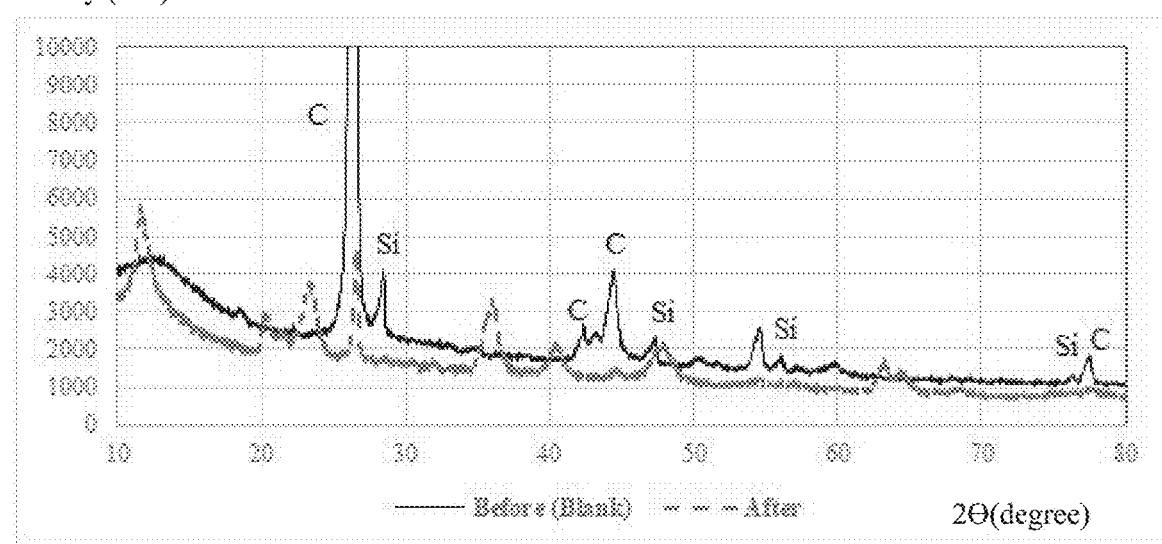
FIG. 9 is the XRD diffraction pattern before and after the negative active material with lithium-ion insertion is exposed to sodium/potassium ions and aluminum ions.

Please refer to FIG. 9, which is the XRD diffraction pattern before and after the negative active material with lithium-ion insertion is exposed to sodium/potassium ions and aluminum ions. It can be clearly found that the characteristic peaks representing Li—Si alloys have completely disappeared. It means that the Li—Si alloys have become polymer compounds with lower energy.

Figure 10:
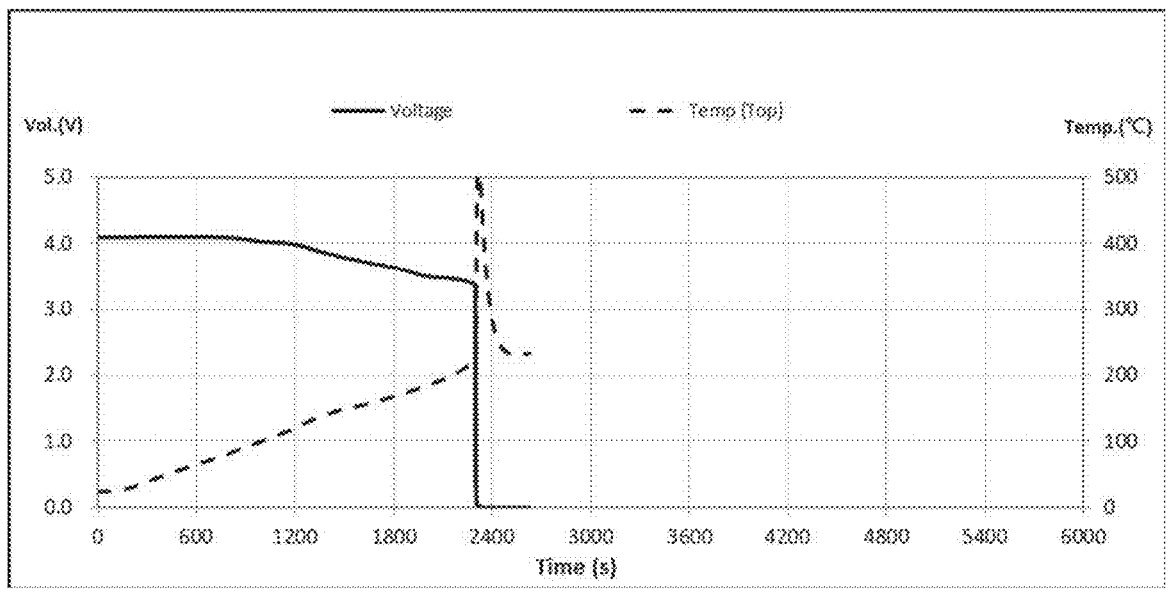
FIG. 10 shows the voltage and temperature curve for the thermal runaway testing of a conventional lithium battery cell.
Figure 11:
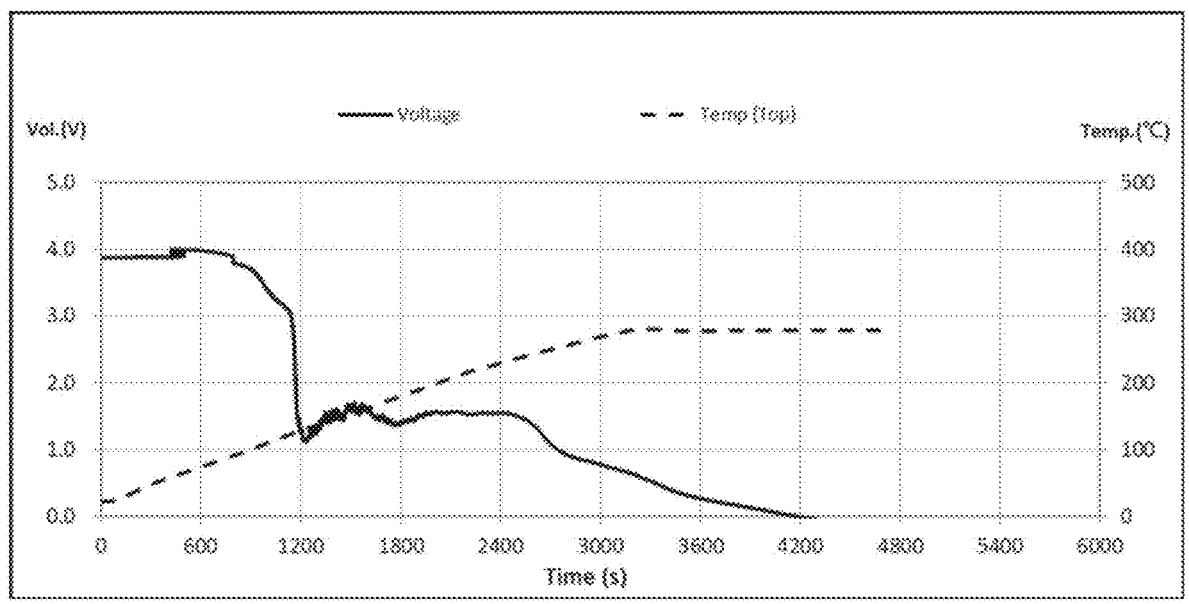
FIG. 11 shows the voltage and temperature curve for the lithium battery cell with thermal runaway suppression of the present invention.

Please refer to FIGS. 10 and 11. FIG. 10 shows the voltage and temperature curve for the thermal runaway testing of a conventional lithium battery cell. FIG. 11 shows the voltage and temperature curve for the lithium battery cell with thermal runaway suppression of the present invention. As shown in the figures, when the thermal runaway is occurred and generating heat, the voltage of the conventional lithium battery cell begins to drop down after the temperature reaches around 500° C. However, for the lithium battery cell with thermal runaway suppression of the present invention, the voltage begins to drop down after the temperature reaches around 100° C. by blocking the electrochemical reaction pathway to effectively avoid the thermal runaway.

Figure 12A:
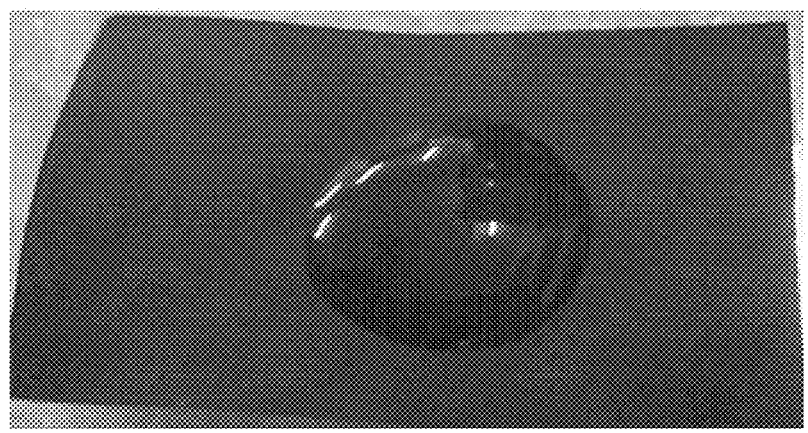
FIGS. 12A to 12C are images of the results of dropping different solutions selected from pure water, $NaOH_{(aq)}$, and $NaAl(OH)_{4(aq)}$ respectively on a cathode with a 100% SOC (state of charge).
Figure 12B:
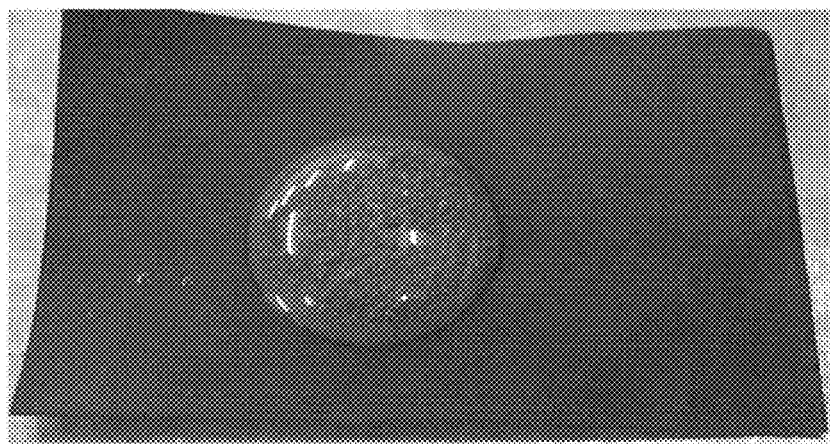
Figure 12C:
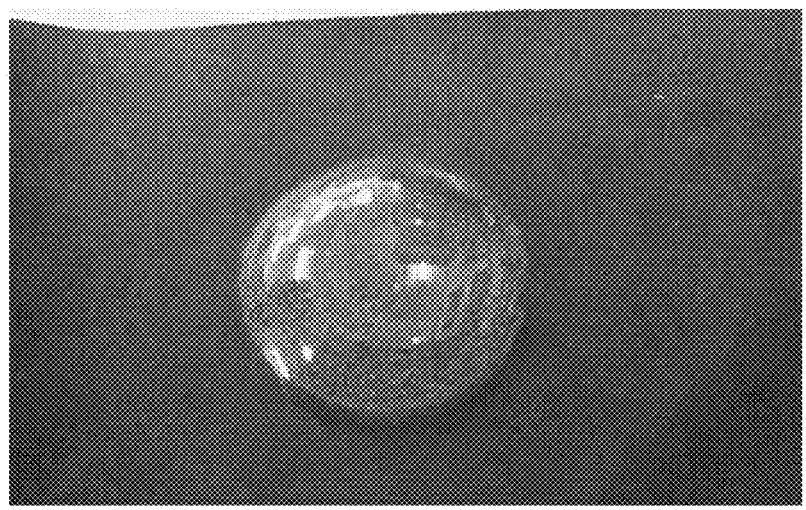

FIGS. 12A to 12C are the images for the results of dropping different solutions selected from pure water, NaOH$_{(aq)}$, and NaAl(OH)$_{4(aq)}$ respectively on a cathode with a 100% SOC (state of charge). In FIG. 12A, it can be seen that the cathode does not react with pure water. In FIGS. 12B and 12C, it can be seen that NaOH$_{(aq)}$ and NaAl(OH)$_{4(aq)}$ form the droplets in hydrophobic state on the surface of the cathode, and a plurality of tiny bubbles are presented in the droplets.

Figure 13A:
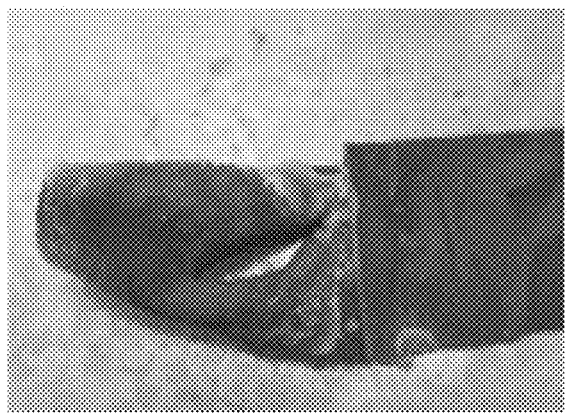
FIGS. 13A to 13C are the images for the results of dropping different solutions selected from pure water, $NaOH_{(aq)}$, and $NaAl(OH)_{4(aq)}$ respectively on a anode with a 100% SOC (state of charge).
Figure 13B:
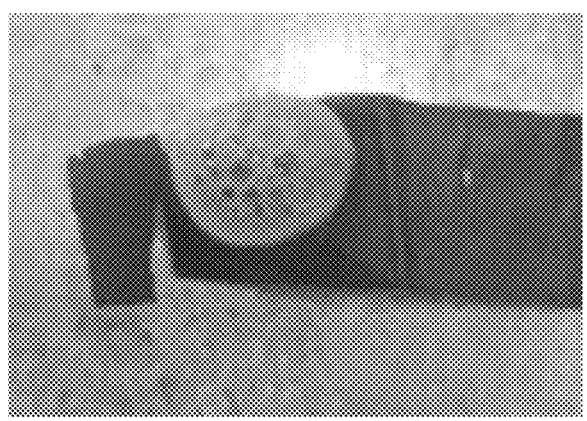
Figure 13C:
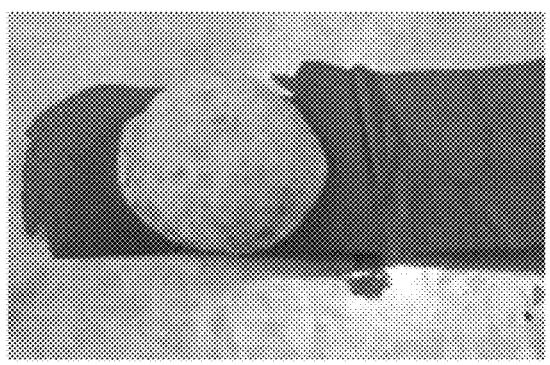
Figure 13D:
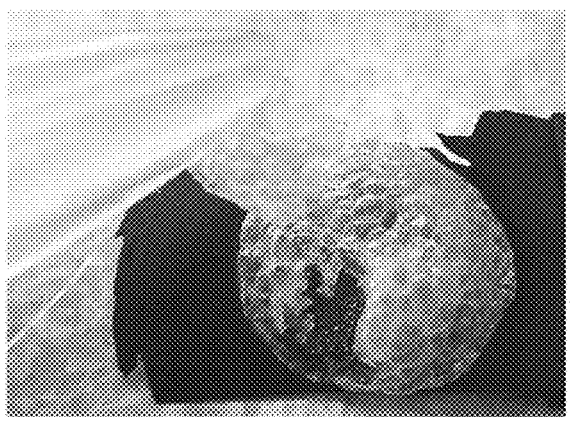
FIG. 13D is the image of FIG. 13C, which the foam is clamped by a jig.

FIGS. 13A to 13C are the images for the results of dropping different solutions selected from pure water, NaOH$_{(aq)}$, and NaAl(OH)$_{4(aq)}$ respectively on an anode with a 100% SOC (state of charge). In FIG. 13A, it can be seen that the remaining lithium in the anode reacts strongly to pure water and causes the anode to crack. In FIGS. 13B and 13C, it can be seen that NaOH$_{(aq)}$ and NaAl(OH)$_{4(aq)}$ form the inorganic polymer with bubbles, such like a foam, on the surface of the anode. Also, a part of the inorganic polymer can be clamped by a jig, as shown in FIG. 13D.

Figure 14A:
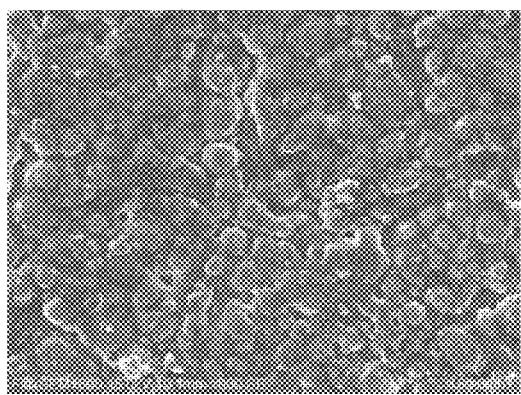
FIGS. 14A and 14B are SEM diagrams of the cathode with a 40% SOC and with a 100% SOC respectively, which 30% sodium hydroxide was dropped over about 1 hour.
Figure 14B:
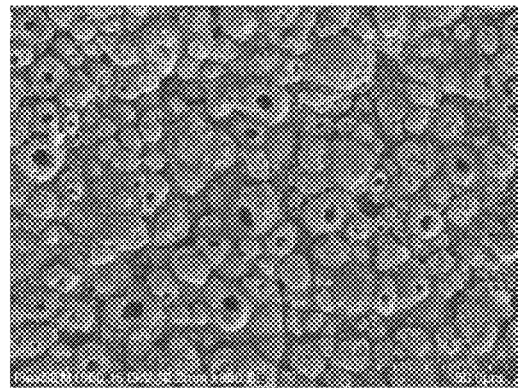

FIGS. 14A and 14B are SEM diagrams of the cathode with a 40% SOC and with a 100% SOC respectively, which 30% sodium hydroxide was dropped over about 1 hour, DMC (dimethyl carbonate) and a pure water were used for surface cleaning, and then dried at 60° C. for 8 hours. As shown in the figures, for the cathode with a 40% SOC, due to the lower lithium-ion extractions, the situation of sodium ions are inserted to the positive of the lithium-ion extractions of the cathode are not significant. However, the undulations of the topography of the surface for the cathode become significant. For the cathode with a 100% SOC, due to the higher lithium-ion extractions, the situation of sodium ions are inserted to the positive of the lithium-ion extractions of the cathode are very significant. The relocation of the lattice and the undulations of the topography of the surface for the cathode with a 100% SOC are also very significant. And it can be observed that parts of the surface even has a cracked state.

Figure 15A:
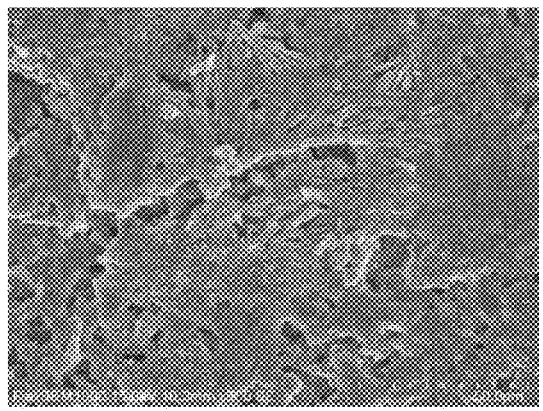
FIGS. 15A and 15B are SEM diagrams of the anode with a 40% SOC and with a 100% SOC respectively, which 30% sodium hydroxide was dropped over about 1 hour.
Figure 15B:
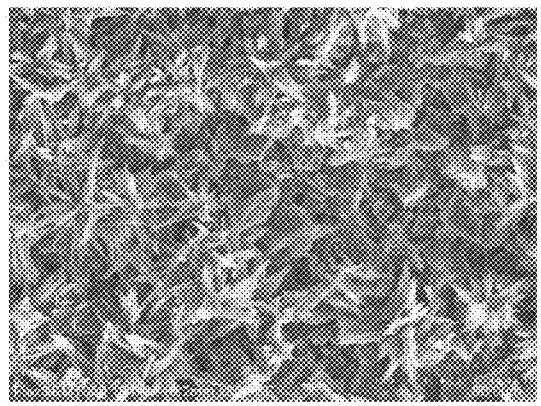

FIGS. 15A and 15B are SEM diagrams of the anode with a 40% SOC and with a 100% SOC respectively, which 30% sodium hydroxide was dropped over about 1 hour, DMC and a pure water were used for surface cleaning, and then dried at 60° C. for 8 hours. As shown in the figures, the sodium hydroxide makes parts of the anode with a 40% SOC form an inorganic polymer (geopolymer), and it also has a needle-like structure of the colloidal silica acid. For the anode with a 100% SOC, the needle-like structure is more obvious.

Figure 16A:
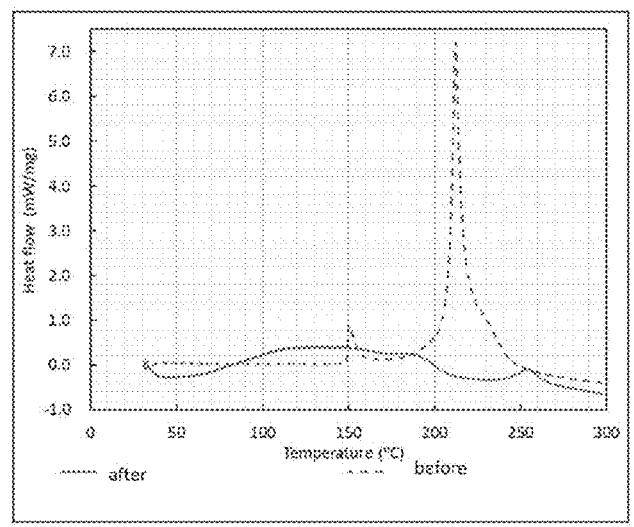
FIGS. 16A and 16B are thermograms of the differential scanning calorimeter for the cathode and the anode using 20% $NaAl(OH)_{4(aq)}$.
Figure 16B:
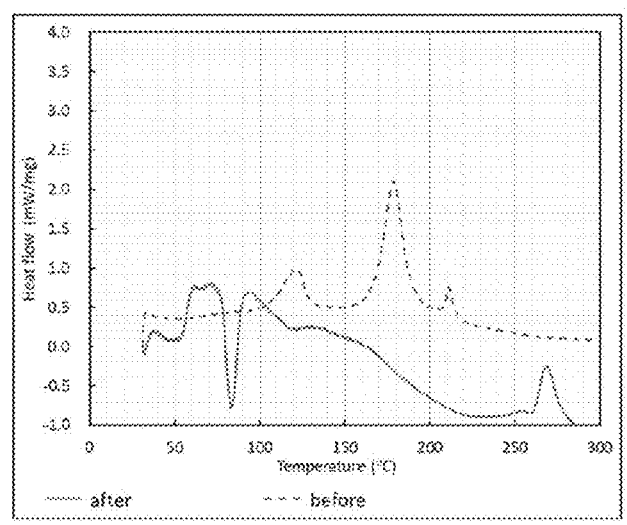

Further, to verify the above-mentioned lower energy of the cathode and the anode, please refer to FIGS. 16A and 16B, which are thermograms of the differential scanning calorimeter for the cathode and the anode using 20% NaAl$(OH)_{4(aq)}$. It can be clearly seen that a peak of the heat flow of the cathode at about 210° C. has obviously disappeared, see FIG. 16A, and a peak of the heat flow of the anode at about 180° C. has obviously disappeared, see FIG. 16B.

Accordingly, the present invention provides a method for suppressing thermal runaway of the lithium batteries. When the temperature of the lithium battery reaches to a predetermined temperature, a metal ion (A) and an amphoteric metal ion (B) are applied to the positive active material and the negative active material to preform reactions. The positive active material with lithium-ion extraction and the negative active material with lithium-ion insertion are transferred to a passivation state with lower energy. The electrochemical reaction pathway is blocked to effectively avoid the thermal runaway of the battery. The metal ion (A) is selected from a non-lithium alkali metal ion, an alkaline earth metal ion or a combination thereof. Moreover, comparing to the conventional arts, the method for suppressing thermal runaway of the invention is performed directly on the active materials that generate the maximum energy to cause the thermal runaway and being the main reaction body of the entire electrochemical reaction. Also, the metal ion (A) will be driven by acquired thermal energy to fill the positive of the lithium-ion extraction or intercalation, and relocate the lattice to form a new stable state, and at the same time, the thermal energy is consumed. The metal ion (A) and the amphoteric metal ion (B) will react with the negative active materials with lithium-ion insertion to transfer to a passivation state. Therefore, both of the positive active materials and the negative active materials would stay with lower energy to improve safety of the lithium batteries.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for suppressing thermal runaway of a lithium battery, comprising steps of:
   step (a): providing a lithium battery capable of performing charging and discharging, the lithium battery including an electrochemical reaction system for lithium-ion extraction and insertion, and an ion supplier being a non-responder in the electrochemical reaction system and located inside the lithium battery, the ion supplier includes at least a compound capable of providing a metal ion (A) and an amphoteric metal ion (B), and a removable protection mechanism covering the ion supplier; and
   step (b): applying the metal ion (A) and the amphoteric metal ion (B) to a positive active material layer and a negative active material layer of the lithium battery, in response to a temperature of the lithium battery reaching a triggered temperature to remove the removable protection mechanism;
   wherein the metal ion (A) is selected from an non-lithium alkali metal ion, an alkaline earth metal ion or a combination thereof;
   wherein the metal ion (A) obtains an electron and reduces at the positive active material; and
   wherein the metal ion (A) and the amphoteric metal ion (B) form a polymer compound with the negative active material to passivate the negative active material layer.

2. The method of claim 1, wherein the metal ion (A) is selected from a sodium ion, a potassium ion or a combination thereof.

3. The method of claim 1, the amphoteric metal ion (B) is provided by NaOH, KOH, NaCl, $NaNO_3$ or $NaAl(OH)_4$.

4. The method of claim 1, wherein the amphoteric metal ion (B) is an aluminum ion.

5. The method of claim 1, wherein the amphoteric metal ion (B) is provided by $AlCl_3$, $AlBr_3$, $Al(NO_3)$, $AlClO_4$, $AlF_3$, $AlH_3$, $Zn(OH)_2$ or $NaAl(OH)_4$.

6. The method of claim 1, wherein the removable protection mechanism is a protecting layer, which is removable via thermal decomposition or dissolved in a polar solution.

7. The method of claim 1, wherein the ion supplier is disposed in the electrochemical reaction system.

8. The method of claim 1, wherein the removable protection mechanism is a capsule, which is removable via thermal decomposition or dissolved in a polar solution.

9. The method of claim 1, wherein the ion supplier is disposed in the positive active material layer and/or the negative active material layer of the electrochemical reaction system, coated on a separator of the electrochemical reaction system or added in an electrolyte of the electrochemical reaction system.

10. The method of claim 9, wherein the separator of the electrochemical reaction system is stacked by a plurality of ceramic powders, and the ion supplier is mixed with the plurality of ceramic powders.

11. The method of claim 10, wherein the ceramic powders have ionic conductivity.

12. The method of claim 1, wherein the removable protection mechanism is removable via thermal decomposition, and the material of the removable protection mechanism is selected from paraffin oil, microcrystalline wax, low density PE (polyethylene), poly(trans-1,4-butadiene), poly (tetramethylene oxide), isotactic poly(methyl methacrylate), poly(ethylene oxide), poly(ethylene adipate), isotactic poly (1-butene), poly(ethylene).

13. The method of claim 12, wherein the material of the removable protection mechanism is mixed with a mineral oil.

14. The method of claim 1, wherein the compound of the ion supplier is a polar solution releasing material triggered by the triggered temperature, and the removable protection mechanism is dissolved in the polar solution.

15. The method of claim 14, wherein the polar solution is water.

16. The method of claim 14, wherein material of the removable protection mechanism is selected from gelatin, gum arabic, chitosan, sodium caseinate, starch, lactose, maltodextrin, poly-l-lysine/alginate, polyethyleneimine/alginate, calcium alginate, polyvinyl alcohol.

17. The method of claim 1, wherein the compound of the ion supplier is a material with etching capability in the triggered temperature, and the removable protection mechanism is selected from an etchable material by the compound in the triggered temperature.

* * * * *